United States Patent [19]

Duffy

[11] Patent Number: 4,775,555

[45] Date of Patent: Oct. 4, 1988

[54] APPARATUS AND PROCESS FOR MAKING LOCKING NUTS

[75] Inventor: Richard Duffy, Utica, Mich.

[73] Assignee: Nylok Fastener Corporation, Rochester, Mich.

[21] Appl. No.: 907,582

[22] Filed: Sep. 15, 1986

[51] Int. Cl.⁴ .......................... B05D 7/22; B05B 12/00
[52] U.S. Cl. .................... 427/183; 10/10 P; 118/308; 118/312; 239/589; 239/597; 427/235; 427/236; 427/239; 427/295; 427/421; 427/424; 427/425
[58] Field of Search ............... 427/235, 236, 425, 239, 427/421, 424, 183, 295; 10/10 P; 118/312, 308; 239/589, 597

[56] References Cited

U.S. PATENT DOCUMENTS

| | | |
|---|---|---|
| 2,770,494 | 11/1956 | Nelson ................................ 239/597 |
| 2,903,190 | 9/1959 | LeDeit ................................ 239/597 |
| 3,022,016 | 2/1962 | Shrewsbury ........................ 239/597 |
| 3,335,965 | 8/1967 | Riccio ................................ 239/589 |
| 3,720,533 | 3/1973 | Gallagher ........................... 118/308 |
| 3,896,760 | 7/1975 | Duffy ................................. 118/308 |
| 4,060,868 | 12/1977 | Axvig et al. ........................ 118/308 |
| 4,366,190 | 12/1982 | Rodden et al. ..................... 427/183 |

*Primary Examiner*—Janyce A. Bell
*Attorney, Agent, or Firm*—Niro, Scavone, Haller & Niro, Ltd.

[57] ABSTRACT

A process and apparatus for manufacturing self-locking fasteners in which a resin deposit of patch is applied to a portion of the threads. A resin stream entrained in a gaseous jet is directed through a nozzle which is an axial registration with the fastener. The nozzle has an end wall and an arcuate slot therein which directs application of the entrained resin to the threads of the fastener in a controlled manner.

30 Claims, 9 Drawing Sheets

APPARATUS AND PROCESS FOR MAKING LOCKING NUTS

FIELD OF THE INVENTION

The present invention relates to an improved process and apparatus for the manufacture of self-locking, internally threaded elements and more particularly to a device for the continuous manufacture of elements such as fasteners wherein the self-locking feature is obtained through a deformable plastic patch secured onto the threaded internal surface of the element.

BACKGROUND OF THE INVENTION

In prior art patents, there are disclosed various methods and apparatus for applying locking patches of resilient resin to internally threaded articles such as nuts, having openings at both ends of the threaded portions. In the devices disclosed in these patents, generally a rotatable table is disposed for receiving fasteners about the periphery of the table and transporting them through a plurality of stations to effect application of the patch to the internal threads of the fastener elements.

In U.S. Pat Nos. 4,054,688 and 4,100,882, there is provided a means whereby a portion of the heat fusible resin particles is deposited on one area of the hot threaded surface of an element, and thereafter, resin particles are deposited on a further area of the threaded surface to produce two distinct patches at a desired location. In each of the aforementioned patents, the internally threaded element is retained on the rotatable support member in a selected position by means of a slot which receives a portion of the external head of a hex headed nut, by way of example. After a discrete patch is applied to the internal threads of the fastener, a turning moment is applied to the fastener element to move it such that a different external surface of the hexagonal element is received by the slot, after which a second discrete patch is applied to the fastener.

U.S. Pat. No. 3,858,262 discloses a method and apparatus for making a self-locking threaded element which avoids the difficulties of resin deposit on the end faces of the threaded element and is effective to deposit resin on the threaded surface in the selected area with a minimum of spatter on other portions of the threaded surface. In that method and apparatus as disclosed, a nut or other internally threaded member is heated, and while mounted with its axis in an up-anddown position, the threaded surface is sprayed with finely divided resin particles which were caught and built up on the heated surface to form a plastic body.

In U.S. Pat. No. 3,894,509, there is disclosed an apparatus and method for mass production of such internally threaded elements including an automatic means to move a succession of internally threaded elements through various stations in which the elements are loaded onto a conveying and treating member. A resilient resin locking patch is formed on the threaded surface of the elements by deposition of heat fusible resin powder and thereafter, the elements are unloaded.

U.S. Pat. Nos. 3,416,492 and 4,366,190 discloses methods and apparatus wherein a self-locking internally threaded element is manufactured having a locking body of resilient resin provided over 360 degrees of arc of the internal threaded surface.

While the above referred to apparatus and methods have proved to be successful in achieving the objects for which they were intended, it has become desirable to have an improved method and apparatus which provides for superior control of the resin deposit or patch application including the area of the deposit, reduction of splatter and improved flow and efficient application of the resin powder. While the present invention will be described particularly with respect to applying heat softenable resin particles to the initial threads of internally threaded articles, it is to be understood that the apparatus and process of the present invention can be utilized to apply a variety of materials, including thermoplastic resins and thermoplastic resin compounds.

It is therefore a desirable object of the present invention to provide an improved method and apparatus for the manufacture of self-locking internally threaded elements wherein the self-locking feature is obtained through a plastic resin deposited onto the internal surface of the element.

A further desirable object of the present invention is to provide an improved method and apparatus for the manufacture of internally threaded elements wherein improved control of the application of the locking body of resin is obtained over a desired arcuate and vertical area of the internal threads of the element.

A still further object of the invention is to provide an improved spray guide applicator having improved application, control and definition of the resin application over a desired arcuate and vertical area of the internal threads of internally threaded elements.

SUMMARY OF THE INVENTION

The above objects, and other objects which will become apparent as the description proceeds, are achieved by providing apparatus for applying locking patches of resin to internally threaded articles having openings at both ends thereof comprising a support for receiving the threaded articles from the feeder and for supporting them in a substantially fixed relation for treatment with the axes of the threaded portions in an up and down position and with the opening at the upper and lower ends of the threaded portions substantially uncovered.

Means is provided for heating threaded portions of the articles to a temperature above ambient temperature and means are associated with each of the articles for directing particles of resin upwardly through one of the openings of each of the articles. The particles are directed toward an area of each of the threaded portions of the articles in the portion of the path to cause the resin particles to be softened by heat from the threaded portions and to build up a deposit on each of the areas.

In a preferred embodiment, a succession of internally threaded articles are also conveyed by the support. To this end, the support has a plurality of rotatable platforms disposed thereon, one for receiving each of the threaded articles, and stationary means is located adjacent the path of the support contacting a portion of each of the platforms thereby causing rotation of the platforms. Heat fusible material is then deposited onto a desired circumferential segment of the threaded portion of the articles during movement of the support along a predetermined portion of the path. The present invention also contemplates rotation of the material application means in addition to the platforms, to provide 360 degree circumferential depositing of the heat fusible material. Vacuum exhaust means is provided adjacent the upper ends of each of the articles to draw or suction air through the threaded portions avoiding application of resin particles in undesired areas of said articles and to draw off resin particles which have passed through said threaded portions.

In accordance with the present invention, the new and improved spray guide applicator for directing the particles of resin to the internally threaded area to deposit patches or rings of resin is employed. Patches and rings of the resilient resin are collectively called patches herein. Such an improved spray guide applicator utilizes a relationship between the spray guide applicator's configuration and size, as well as the size of the internally threaded article to receive the patches of resin, which relationship provides for improved application and definition of the resin patches.

The present invention also provides a new and improved process for applying locking patches of resin to internally threaded articles having openings at both ends of the threaded portions which comprises the step of positioning the articles for treatment with the axes of their threaded portions in an up and down position and with the openings at the upper and lower ends of the threaded portions substantially uncovered. The process also includes the step of heating the threaded portions of the articles to a temperature above the softening point of the resin to be applied, as well as the step of directing particles of heat fusible resin upwardly through one of the openings of the articles against an area of each of the threaded portions during movement along the path to cause the resin particles to be softened by heat from the threaded portions and to build up a deposit on the area. The invention in one of its preferred embodiments also contemplates turning each of the articles or each of the spray guide applicators about the axis of its threaded portions while directing resin particles through the openings during a predetermined arcuate angle at a substantially uniform rate of rotation.

BRIEF DESCRIPTION OF THE DRAWINGS

For a fuller understanding of the nature and desired objects of this invention, reference should be made to the following detailed description taken in connection with the accompanying drawing, wherein like reference characters refer to corresponding parts throughout the several views of the preferred embodiments of the invention and wherein:

FIG. 14 is a cross sectional view of the applicator shown in FIG. 13, taken along the line XIV—XIV. In this view, the gear is shown as disposed on the applicator so that it can be rotated in the apparatus shown in FIG. 14a.

DESCRIPTION OF THE PREFERRED EMBODIMENT

Figure 1:
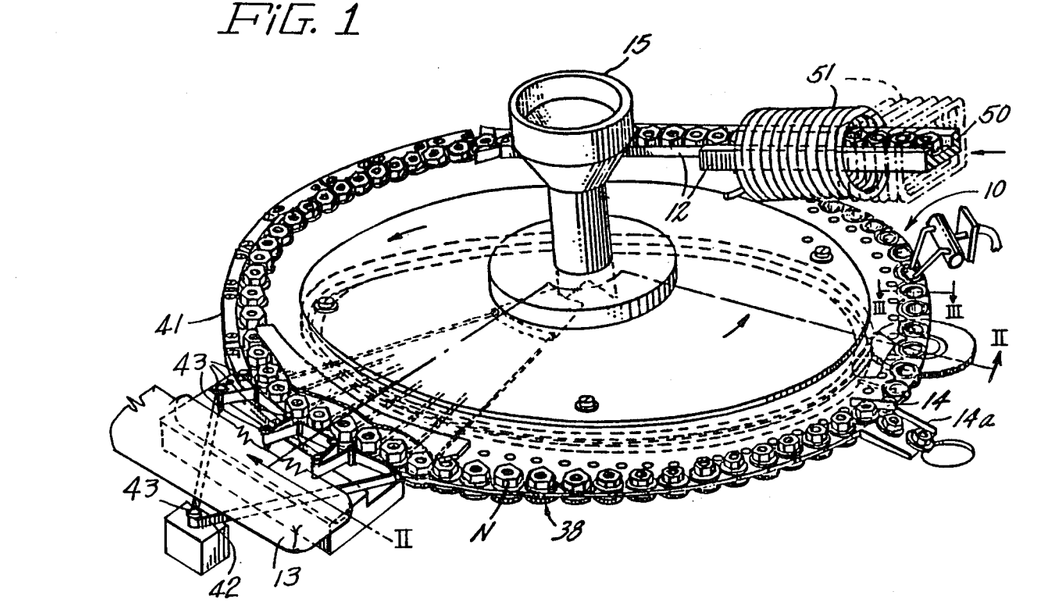
FIG. 1 is a perspective view showing a device for the manufacture of self-locking internally threaded fasteners employing a spray guide applicator constructed in accordance with the teachings of the present invention.
Figure 2:
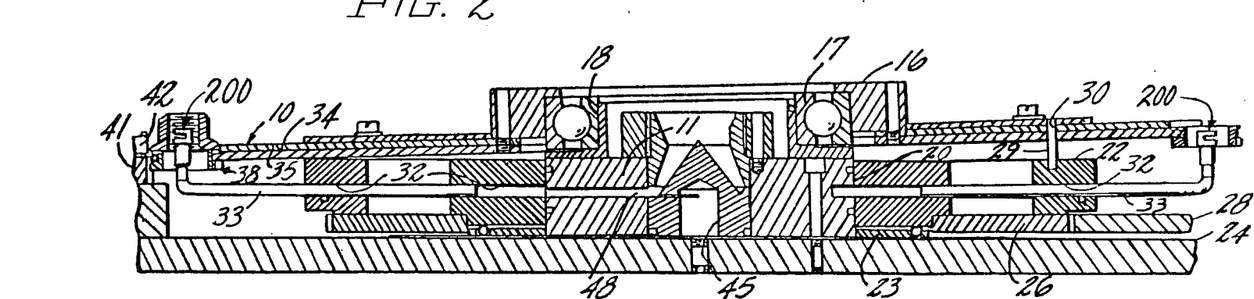
FIG. 2 is a sectional elevational view taken along the line II—II of FIG. 1, showing details of the structure of FIG. 1.
Figure 12:
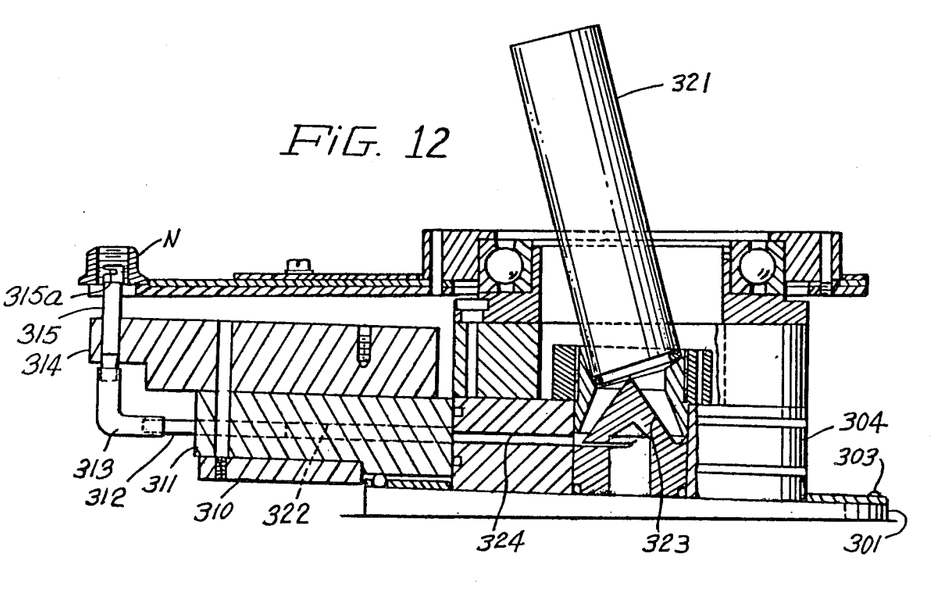
FIG. 12 is a cross-sectional view of another embodiment of the apparatus of the present invention. This embodiment is similar to the embodiment of FIGS. 1 and 2, except that the powdered resin is applied at one station only.

Referring to the drawings, and in particular to FIGS. 1 and 2 as well as FIG. 12, there is shown apparatus for the manufacture of a self-locking internally threaded article in the form of a nut N, which generally comprises a rotatably mounted transport member in the form of a table 10 movable along a predetermined rotary path about its central axis, in the direction shown by the arrows of FIG. 1.

As the table 10 is continuously rotated about a fixed housing 11, a point on the table 10 will be seen to pass through a plurality of stationary work areas referred to as stages of the operation for the purposes of the present description.

In the first stage of operation, loading chute 12 which is inclined downwardly toward the surface of the table 10 is effective to deposit a nut N onto the table, and during the next stage a powdered material is applied through a spray operation to the internal threaded surface of the nut. This stage is substantially enclosed by a vacuum hood 13, the operation of which is explained in detail below.

In the embodiment of FIGS. 1, 2 and 12, a single depositing spray stage is used, with the arcuate length of the application varying according to the amount of deposit desired. While a single powder application stage is shown herein, it will be appreciated that multiple powder application stages are contemplated by the present invention, depending on the type of deposit desired.

During the next stage, an arm 14, connected to an inclined ramp 14a, and having a cam surface disposed adjacent the upper surface of the table 10 is effective to unload the nut N from the support structure 24 and convey it in an opening in the support structure. During a subsequent stage of operation, which substantially covers that portion of the table 10 located between the unloading station and the loading station, the means for applying resin material to the nut N are purged of residual material, and are readied for the next sequence of operation.

Referring to FIGS. 1 and 2, the stationary housing 11 is provided with a funnel shaped hopper 15 which serves to receive the powdered resin for application to the internal threads of nut N.

Referring to FIGS. 2 and 12, it will be noted that the table 10 is provided with a hub 16 which receives a ball-bearing member 17. The central housing 11 is provided at its upper portion with a bearing surface 18 on which the table hub 16 and bearing 17 are received.

The external surface of the housing 11 further provides a second bearing surface 20 on which is mounted a rotatable block 22. The rotatable block 22 rests on a ball-bearing unit 23 disposed on the upper surface of support structure 24, which also supports the housing 11.

It will be noted from FIGS. 2 and 12, that cylindrical portion of housing 11 on which the bearing surface 20 is formed, is substantially perpendicular to the support structure 24 and therefore the rotatable block 22 moves in a plane substantially parallel to the surface of the support structure 24. However, the cylindrical portion of the housing 11 on which the bearing surface 18 is formed is slightly canted with respect to the surface of the support structure 24, providing for rotation of the table 10 in a plane forming a slight angle with the surface of the support structure 24, and the plane of rotation of the block 22.

The rotatable block 22 is provided with a ring gear 26 in meshing engagement with a gear 28 connected to a drive motor. Extending upwardly from the block 22 is a pin 29 which is slidably received in a cylindrical bore 30 formed in the table 10. It will therefore be evident from FIGS. 2 and 12, that operation of the motor to drive the gear 28 causes rotation of the block 22 which in turn drives the table 10 by virtue of the interconnected relationship between the pin 29, the table and the block. It should further be evident that rotation of the block 22 and the table 10 causes the block and table to move to a position where the two members are in close relation to one another, to a relation where they are separated a maximum distance apart as shown.

Referring to FIGS. 1, 2, 5 and 12, the block 22 is shown to have formed therein a plurality of circular cross-section apertures 32 each having an opening inwardly toward the housing 11 and receiving at the opposite end a tube 33, the tube and aperture forming in combination a conduit means. Attached to the end of tube 33 is a spray guide applicator 200 made in accordance with the present invention for controlling the application of resin deposits and which is discussed in more detail hereinafter.

Figures 6, 7:
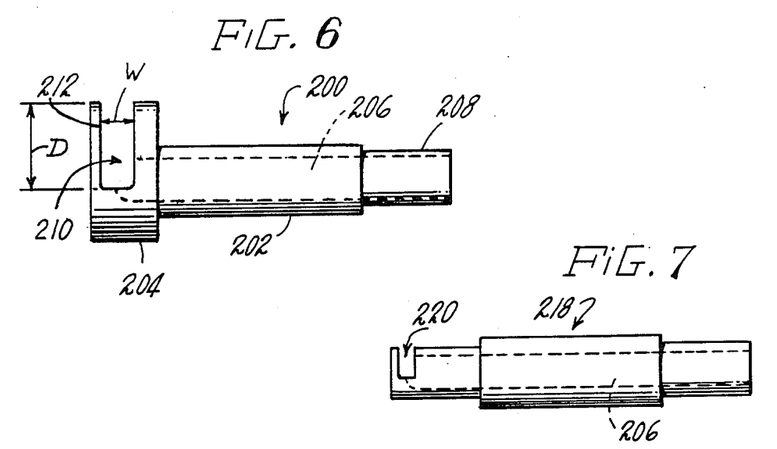
FIG. 6 is a side plan view of the spray guide applicator made in accordance with the invention for use with threaded fasteners having large size internal diameters.
FIG. 7 is a side plan view of a spray guide applicator of the present invention for use with threaded fasteners having intermediate size internal diameters.
Figure 9:
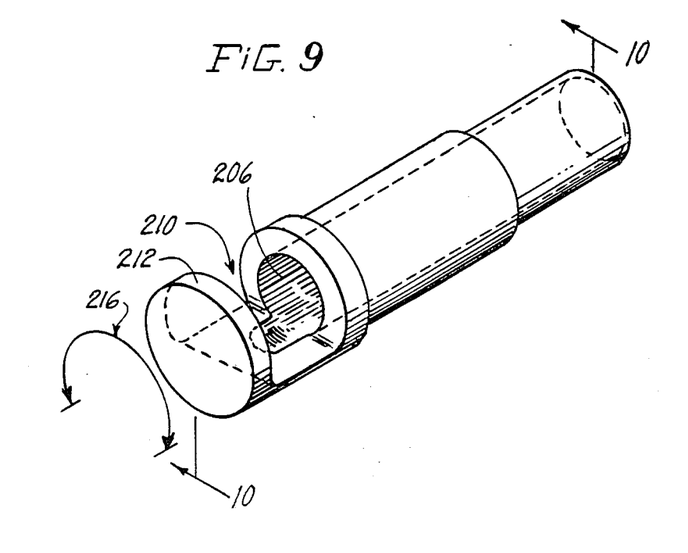
FIG. 9 is a perspective view of the spray guide applicator of FIG. 6.
Figure 10:
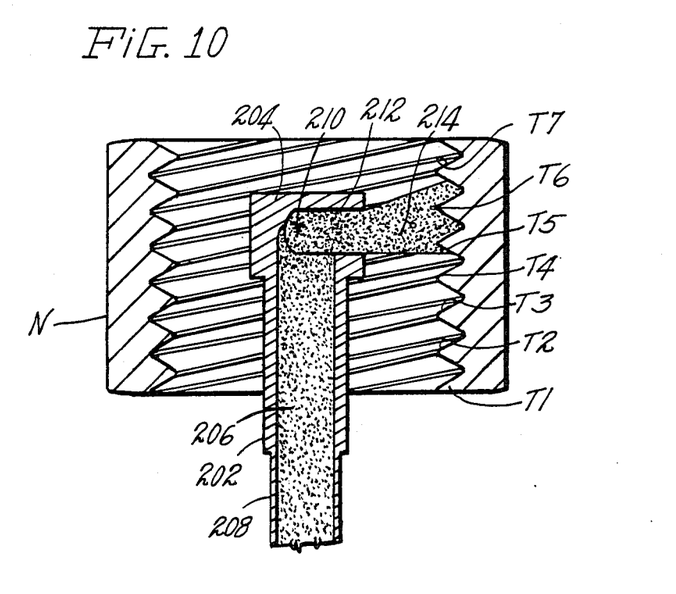
FIG. 10 is a cross-sectional view taken along the line 10—10 of FIG. 9.
Figure 11:
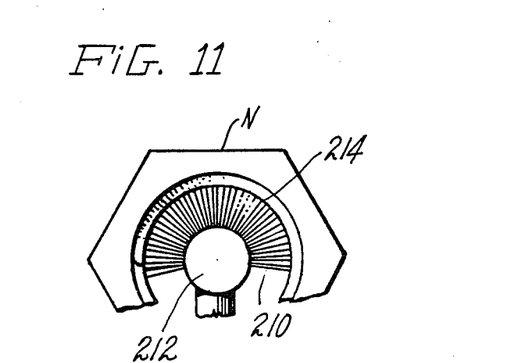
FIG. 11 is a top plan view of FIG. 10 showing the fan-like spread of the stream of resin particles.

Referring now more particularly to FIGS. 6, 9 and 10, there is illustrated generally at 200 a spray guide applicator in accordance with the present invention. The applicator 200 comprises an elongated conduit portion or shaft 202 and a nozzle portion 204. The nozzle and conduit or shaft portions have a cylindrical passage 206 therein which is preferably concentric with shaft 202. In FIG. 6, the cylindrical passage, also the inner diameter of the conduit or shaft 202, is shown by the dotted lines. The passageway extends from the rear portion 208 of conduit 202 to the nozzle 204 where it curves slightly upward at its entrance to the nozzle portion. The nozzle 204 is provided with a slot or opening 210 which communicates with the cylindrical passage 206. The nozzle portion 204 is preferably cylindrical in configuration having an end portion which forms a deflector surface 212. It has been discovered that varying the width W of the slot 210, as best seen in FIG. 6, varies the vertical area of the resin deposit or patch applied. Control of the vertical area coated and thus the number of threads coated permits improved masking of the internal threaded area, as well as improved definition of the applied material. Control in this manner allows one or more leading threads to be maintained free of resin particle deposit providing improved torque performance and enabling easy assembly of the fastener with a mating member when the fastener is used. This feature is illustrated in FIG. 10 where as shown the stream of resin particles 214 is controlled so that the initial threads T1, T2, T3 and T4, as well as the last thread T7 of fastener N are free of resin particle deposit while threads T5 and T6 are coated.

It has also been determined that the width or slot opening 210 is important in the control and velocity of the resin particle stream, as well as the arcuate coverage of the internal fastening threads. In accordance with the present invention, it has been found that when the circumference of the slot opening is in the range of between about 100 degrees to about 310 degrees and acceptable resin deposit or patch is applied. Spattering is further minimized while optimum velocity is also maintained when the circumference of the slot opening is preferably in the range of between about 180 degrees to about 300 degrees. The circumferential opening of slot 210 is illustrated by the arrows 216 of FIG. 9.

It has also been determined that, in accordance with the present invention, the proportional relationship of diameter of the nozzle to the minor or inner diameter of the fastener to be treated is important to the deposition of the resin particles. In accordance with the present invention, the diameter of the nozzle should be 60 to 80 percent and preferably 65 to 75 percent of the inner diameter of the fastener to be treated to provide improved control and reduced spatter of the stream of resin particles applied to the internal threads of the fastener treated. Accordingly, the present invention contemplates variations in the size of the diameter of the nozzle and its conduit portion relative to the size of the inner diameter of the fasteners to be treated.

The optimum diameter of the nozzle, providing effective and efficient deposition of resin particles, as well as improved patch definition to attain improved torque performance, is approximately 70 percent of the inner (or minor) diameter of the fastener. Nozzles that are 60 to 80 percent of the inner diameter are within the operable range of the present invention and provide acceptable applied patches. Examples of such variations in size of the nozzle diameter are illustrated in FIGS. 7 and 8.

Figure 8:
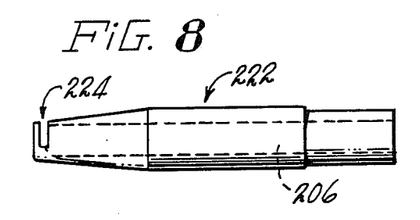
FIG. 8 is a side plan view of a spray guide applicator of the present invention for use with threaded fasteners having small size internal diameters.

With reference to applicator 200 of FIG. 6 as representing a large size diameter nozzle, the applicator 218 and nozzle 220 of FIG. 7 represents generally the configuration of an intermediate size while the applicator 222 and nozzle 224 of FIG. 8 represents generally the configuration of a small size in accordance with the invention.

Coverage ranges of the arcuate internal threaded surfaces of a fastener, as described above, have been achieved to a certain extent by adjusting the depth of the slot or opening 210. It has been determined that such a relationship may be expressed as a percentage of the diameter of the nozzle portion 204 of spray guide applicator 200. Specifically, in order to obtain an acceptable deposit or patch of sprayed resin powder, the slot depth D is maintained at between about 30 percent to about 85 percent of the diameter of nozzle portion 204. Further, it is preferred that the slot depth D be in the range of between about 45 percent to about 75 percent of the diameter of nozzle portion 204.

The cylindrical passageway 206 is constructed to be as large as possible (as illustrated by the dotted lines of FIGS. 6–9 inclusive) consistent with maintaining strength of the walls of the conduit portion or shaft 202. Larger passageways maximize the volume and amount of resin powder which can be directed through the conduit while minimizing the amount of air (gas) pressure and the velocity of air required to move the resin powder through the spray guide applicator. This feature improves the definition of the resin deposition area by reducing spattering caused in part by higher air pressures and velocities.

The spray guide applicators of the present invention are preferably formed of metal and alloys which readily dissipate heat acquired by radiation or inadvertent contact with the heated fasteners. Construction in this manner reduces the adherence of resin powder particles on the walls of the applicator passageways and helps eliminate clogging or restricted flow. Aluminum and aluminum alloys are suitable metals for forming the spray guide applicators. Applicators made of steel, for example, are less preferred since steel tends to hold the heat transferred from the fasteners with the result that clogging and restricted flow may occur. Accordingly, consistent with the principles of the present invention, the spray guide applicators are maintained free from contact with the heated fasteners.

Figure 3:
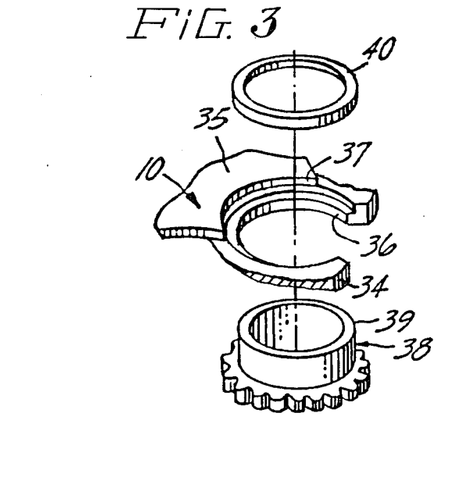
FIG. 3 is an exploded perspective elevational view, taken on an enlarged scale, showing elements forming a typical nut supporting platform in the structure of FIGS. 1 and 2.

As best shown in FIG. 2 and FIG. 3, the table 10 comprises an upper plate 35 and lower plate 34, the lower plate having a plurality of circular openings 36 formed about its periphery and the upper plate having a plurality of semi-circular walls 37 forming the outer periphery thereof, adjacent openings 36. As a tube 33 is provided at each of the openings 36, rotation of the table 10 and block 22 causes the tubes 33 to be moved upwardly through the openings 36 to a position shown at the left of FIG. 2 and downwardly to a position shown at the right of FIG. 2. This up and down movement is provided due to the angular orientation of the plate and block during rotation of table 10 and block 22, as described above.

Figure 4:
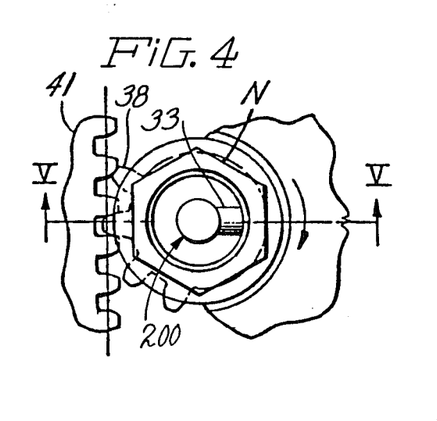
FIG. 4 is a top plan view showing a typical nut supporting platform of the structure of FIGS. 1 and 2, taken on an enlarged scale to show further details of the elements.
Figure 5:
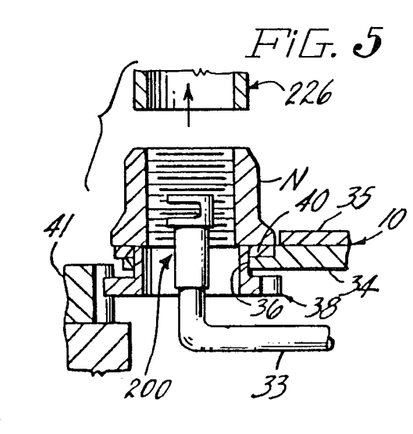
FIG. 5 is an elevational sectional view taken along the lines V—V of FIG. 4; and also showing an adjacent vacuum hood.

As best shown in FIGS. 3–5, in one embodiment of the present invention, at each opening 36 in plate 34, a pinion gear 38 is assembled by inserting a tubular flange 39 of the gear through the opening 36 from the underside of the plate. Locking ring 40 is then pressfit onto the flange 39 to attach gear 38 to plate 34. The locking ring 40 is of a thickness to be received in a counter bore formed in the plate 34 such that the upper surface of the ring is flush with the top surface of the plate 34. Clearance between the opening 36 and the flange 39 is such that the pinion gear 38 is free to rotate when so assembled.

Referring now to FIG. 1, taken together with FIGS. 4 and 5, at selected arcuate segments of the path of circular rotation of the table 10 and block 22, one or more racks 41 are disposed such that the teeth of the rack 41 will be brought into meshing engagement with the teeth of a pinion gear 38 during rotation of the table and block combination. The rack 41 is mounted to the upper surface of the stationary support structure 24 as best shown in FIGS. 2 to 5. While the means for contacting the pinion gear 38 is shown herein as a stationary rack 41, it should be evident that such means could be a variety of interengaging structures. Such structures include, but are not limited to a circular ring gear having internal teeth aligned to mesh with the pinion gear 38 at desired locations, or portions of such a gear employed in a similar fashion as the described racks.

In accordance with the present invention, means may be provided at the spraying stage, beneath hood 13, to contact the outer flange face of the periphery of the nut N, while the nut N is being processed at that stage. As shown in FIG 1, a silicone belt 42 is threaded over a plurality of pins 43 to form a substantially arcuate belt surface, conforming substantially to the circumference of the outermost periphery of the flange on the nuts N, as they are rotated.

In operation, the present device employs the principles taught in U.S. Pat. Nos. 3,995,074, 4,054,688 and 4,100,882 in dispensing material from the funnel 15 to the exit point from the outer end of each tube 33. Briefly stated, a preferred material including, but not limited to, resin powders, thermoplastic, nylon powders, resin powders and similar sprayable powders, is provided at the hopper 15, and is forced through the tubes 33 by fluid pressure caused by an air pump, the air pressure being introduced into the circular bore 45 in the housing 11. In the present invention, however, it is desired to provide continuous deposition of material on the fastener throughout an arcuate segment of rotation of the table. Accordingly, as shown in FIG. 2, table 10 includes an arcuate bore 48 provided in housing 11 extending over an arcuate segment of rotation of table 10 through the housing from bore 45 to circular aperture 32, when aligned with the arcuate bore 48.

Referring now to FIG. 1, a sequence of operational steps will be described in which it is desired to provide a locking patch over 360 degrees of a portion of the internal threads of the fastener element N. In practicing the teachings of the present invention, fasteners N are fed from a vibrator device or similarly orienting and feeding device (not shown) into a chute 50 which is surrounded by a heating coil 51 where the fastener N is raised to a temperature sufficient to cause a powder, preferably a thermoplastic resin powder, to adhere to the threaded surface of the fastener when contacted thereby, and to be fused by heat from the surface to form a continuous plastic body or patch. As each fastener N approaches the table 10, the fastener will be deposited in registry with a semi-circular wall 37 of plate 35.

In the described typical cycle operation, a plurality of the fasteners N are contained on a vibratory feeder or other device (not shown) which is effective to feed the fasteners into the chute 50 where they are passed through the heating coil 51 and raised to a temperature sufficient to cause a thermoplastic powder to adhere to the threaded surface of the fastener.

Each fastener N is in turn, located in a position as shown in FIGS. 4 and 5 wherein the flange of the fastener is disposed on the surface of the table 10 adjacent the semi-circular wall 37, supported partially by the tubular flange 39 of the pinion gear 38 forming a rotatable platform for the fastener. The fastener N is then passed into an area along the circular path of the table 10 wherein the circular cross-section aperture of the tube 33 is open to the arcuate bore 48 providing the flow of resin material through the bore and tube 33 and into the flanged nut N.

In the instances where a patch is to be applied about the complete circumference of a portion of the internal threads of the nut, (i.e. a 360 degree patch is desired), rotation of either the spray tubes or the nut to be processed is necessary to get a satisfactory applied patch. In other instances, rotation of the nuts or spray tubes is not desired and resin is deposited on a portion of the 360 degree path of the internal threads, as described in detail above. Accordingly, in one embodiment, rotation of the nut is accomplished as each fastener approaches the point where the aperture 32 of the tube 33 is positioned for flow of material. Specifically, pinion gear 38, on which the fastener N is resting, is brought into meshing engagement with a rack 41. Gear 38 is then caused to turn, thereby rotating the fastener during the deposit of material and applying a 360 degrees patch about a desired portion of the threads.

In the alternate embodiment shown in FIG. 12, the structure and operation of the apparatus is similar to the embodiment shown in FIGS. 1 and 2. The apparatus is disposed upon a spacer post 301 which supports a post 304. The gear 310 is carried upon a horizontal ring tube 311 which rides upon a ball bearing 303 about a post 304. A horizontal tube 312 is fitted in an internal conduit 322 formed in the ring tube 311. One end of an elbow 313, generally formed of a plastic material such as Tygon, is fitted on the end of the tube 312. The other end of the elbow 313 is fitted onto the spray guide applicator 315. Spray guide applicator 315 is rigidly disposed in a tube holder 314 that is affixed to ring tube holder 311. Resinous particles that are to be applied to the threaded fasteners flow through powder feed tube 321 that is canted at an oblique angle to the apparatus. As the powder emerges from the feed tube 321, the particles strike the generally conically shaped disperser 323 from whence it flows through a conduit 324 formed in post 304. As internal conduit 322 indexes in front of conduit 324, powder will flow into it and thence into tube 311 and finally into spray applicator nozzle 315. As the powder emerges from the mouth 315a of the nozzle, it impinges upon nut N and deposits upon the threads as described previously.

Figure 13:
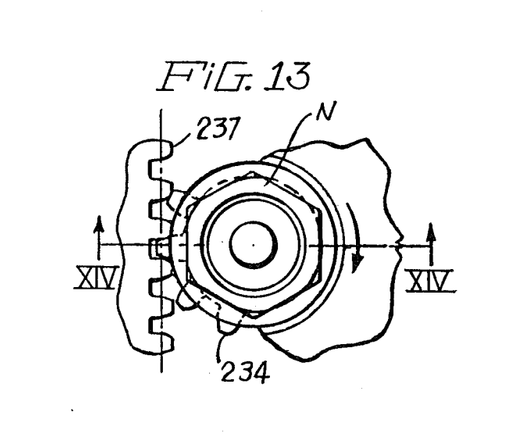
FIG. 13 is a top view of another embodiment of a spray guide applicator in which the nut is held stationary relative to the spray guide applicator that is rotated about its axis.
Figure 14:
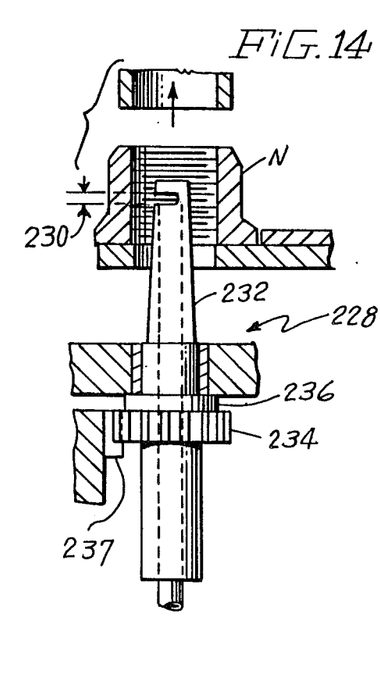
Figure 14A:
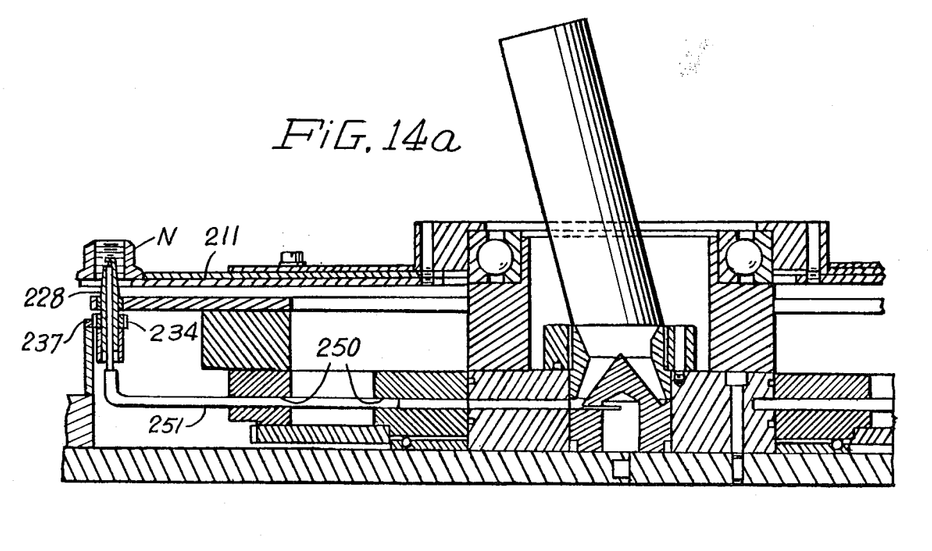
FIG. 14a is a cross-sectional view of the embodiment of the present invention that can use the spray guide applicator shown in FIG. 14. As mentioned above, in this embodiment, the spray guide applicator is rotated while the threaded fasteners remain in a stationary position relative to the applicator.
Figure 14B:
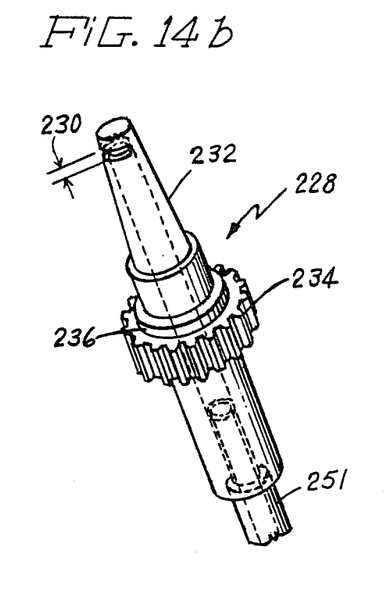
FIG. 14b is a perspective view of the spray guide applicator and gear shown in FIG. 14.

In an alternate embodiment, as illustrated in FIGS. 13, 14 and 14b, a 360 degree patch application can be achieved by rotation of the applicators through which the powdered material is sprayed. In this regard, spray guide applicator 228 having a nozzle 230 and a conduit portion or shaft 232, includes a pinion gear 234. Pinion gear 234 is press fit over the end, opposite nozzle 230 and positioned on shaft 232 so as to abut a shoulder 236 on the shaft.

As can be seen in FIG. 14a, pinion gear 234 is rotated as it approaches the point at which aperture 250 of tube 251 is positioned for flow of material, so as to apply a 360 degree patch or ring to a portion of the internal threads of the fastener N. This operation is similar to that described above in reference to FIGS. 4 and 5. Specifically, pinion gear 234 is brought into meshing engagement with a rack 237 which causes the pinion gear and attached spray guide applicator 238 to rotate within the fastener. Rack 237 includes a pawl and spring (not shown) which together act as an expandable guide path for accepting pinion gear 234 and preventing backward motion. Construction in this manner helps to alleviate path alignment problems which could be caused by misalignment of the pinion gear 234 and rack 236.

This spraying operation described above takes place for at least one complete rotation of spray guide applicator 228 over a predetermined arcuate path of travel of table 211 so that a 360 degree patch or ring of minimum acceptable thickness is applied to a portion of the internal threads of fastener N. It should be understood that powder flow can be adjusted during the spraying operation to adjust the amount of powder deposited on the fastener during that time period. Such adjustment of powder flow accordingly determines the thickness of the patch which will be applied to the fastener threads.

As previously described with reference to FIG. 2, the arcuate bore is designed and fabricated to cover that arcuate portion of the table rotation adequate to cover the desired portion of the internal threads on which the patch is to be deposited, taking into account the rotation of each fastener N or the spray applicator guides, relative to the rotation of the table. As an example, if it is desired to deposit a patch covering the full 360 degrees of a portion of the internal fastener threads, the arcuate bore will be disposed over an arc through which the table travels during at least one rotation of the fastener N or the spray guide applicators through 360 degrees.

While covering the full 360 degrees of a portion of the internal fastener threads is preferred in certain instances, a satisfactory fastener, having acceptable torque performance and patch definition, can be accomplished by covering less than 360 degrees of the internal fastener threads. It has been determined that satisfactory torque performance can be obtained with arcuate internal fastener thread coverage, for first use of an internally threaded fastener in the range of between about 90 degrees to 360 degrees of internal arcuate thread coverage. A more preferred range is internal arcuate thread coverage in the range of from about between 110 degrees to about 270 degrees.

In the situation where the fastener will be subject to reuse, it has been determined that internal arcuate thread coverage in the range of between about 130 degrees to 360 degrees provide satisfactory torque performance. A more preferred range in the situation of reusing the fasteners is between about 180 degrees to 270 degrees of internal arcuate thread coverage.

It should be here noted that a hood (as shown in FIG. 1 as number 13) is provided with a negative pressure by vacuum producing means (not shown) and the hood functions in a manner similar to those systems disclosed in the aforementioned prior art, serving to remove excess material during the application of locking patch.

The main requirement of such vacuum producing means is to provide a negative pressure or suction area adjacent the upper opening of the fasteners for drawing in air through the opening at the lower end to reduce deposition of resin particles which have passed through the threaded portion of the fasteners.

Figures 15, 16:
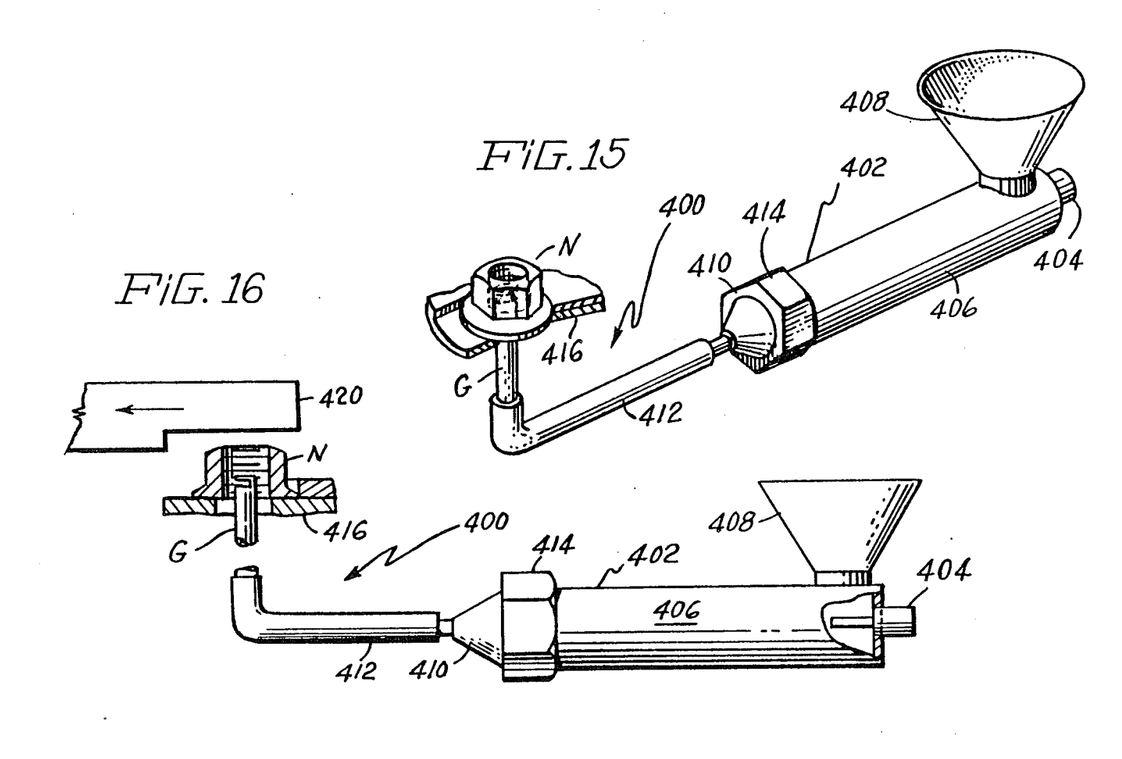
FIG. 15 is a perspective view of an embodiment of the apparatus of the present invention in which individual samples of the threaded fasteners having locking patches can be readily made.
FIG. 16 is a side elevational view of the apparatus of FIG. 15, partially in cross section, illustrating a nut in position to be processed.

FIGS. 15 and 16 illustrate a third embodiment of a device incorporating the principles of the present invention. Specifically, a single unit apparatus for making locking nuts is illustrated generally as 400, which includes a chamber 402 into which air is directed at one end through inlet 404. Chamber 402 includes a passageway 406 extending substantially across its length. A powder funnel 408 is positioned proximate to inlet 404 and in communication with passageway 406 of chamber 402.

Chamber 402 also includes an air exit port 410 at its end opposite that of inlet 404 to which one end of a conduit 412 is removably attached through a mounting structure, such as threaded sleeve 414. The opposite end of conduit 412 is attached to any applicator G of the spray applicator guides described herein. Specifically, a spray applicator guide similar to spray applicator guide 218 of FIG. 7 is illustrated, however, any size guide G can be substituted depending on the size of nut N being processed.

The spray applicator guide G is directed through a nut support 416 on which a fastener or nut N is placed for processing. A vacuum hood 420 is typically placed generally over nut N and in association with a vacuum source (not shown) completing the air flow path through the apparatus thereby collecting powder which is not deposited on the internal threaded surfaces of the nut.

In operation, powder funnel 408 is provided with a source of resin powder to be applied to nut N. The powder is entrained in the air stream provided at inlet 404 and is carried through passageway 406, exit port 410 and conduit 412 to arrive at spray applicator guide G. The air entrained powder is then directed onto a predetermined portion of the arcuate internal threaded surfaces of nut N for application thereto. Any powder not applied to nut N is directed out of the internal area of the nut by vacuum hood 420. Hence, a single nut processing apparatus is illustrated which allows sample nuts to be processed in accordance with the principles of the present invention. Further, the resin patch is applied to the nuts in a more consistent, controllable and cost efficient manner.

Accordingly, an apparatus and process for making locking nuts is provided which applies a resin patch to a predetermined area of the arcuate internal threads of a nut leading to improved nut torque characteristics as well as improved patch definition.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted in a illustrative and not in a limiting sense.

What is claimed is:

1. An apparatus for applying patches of resin to the threads of an internally threaded article having openings at both ends comprising:
    a support for positioning the internally threaded article for processing;
    means for heating the article to a temperature above ambient temperature;
    means for providing a stream of fine particles of said resin to the threads of the internally threaded article to create a locking deposit on the threads entrained in a gaseous jet;
    a spray guide applicator adapted to direct said stream of resin particles through the opening at one end of the article against an area of the threads of said article to cause said resin particles to be retained by said article and to adhere to said area of the threads, said applicator comprising an elongated conduit portion and a nozzle portion, said conduit portion having a passageway therein; said nozzle portion having a top, bottom and side walls and said bottom wall having an opening communicating with said passageway; and
    a slot opening being disposed in said sidewall in a plane forming substantially a right angle to said pasageway, and having a circumferential length of between about 100 degrees and to about 310 degrees, said top wall forming a deflector surface and at least one of said slot and said topwall adapted to direct said stream of resin particles in a line of discharge against said threaded portion of said article in a controlled manner.

2. The apparatus for applying patches of resin to internally threaded articles as defined in claim 1 wherein the circumferential length of said slot opening is between about 110 degrees to about 310 degrees providing a controlled and defined stream of fine particles.

3. The apparatus for applying patches of resin to internally threaded articles as defined in claim 1 wherein the circumferential length of said slot opening is between about 180 degrees to about 300 degrees providing a controlled and defined stream of fine particles.

4. The apparatus for applying patches of resin to internally threaded articles as defined in claim 1 wherein the diameter of said cylindrical nozzle portion is between about 60 percent to about 80 percent of the inner diameter of said internally threaded article providing a controlled and defined stream of particles.

5. The apparatus for applying patches of resin to internally threaded articles as defined in claim 1 wherein the diameter of said cylindrical nozzle portion is between about 65 percent to about 75 percent of the inner diameter of said internally threaded article providing a controlled and defined stream of particles.

6. The apparatus for applying patches of resin to internally threaded articles as defined in claim 1 wherein said support includes means for conveying said internally threaded articles at a uniform continuous speed for processing a uniform succession of said articles.

7. The apparatus for applying patches of resin to internally threaded articles as defined in claim 1 wherein said threaded portions of said articles are heated to a temperature above the softening point of said resin.

8. The apparatus for applying patches of resin to internally threaded articles as defined in claim 1 including means to rotate the spray guide applicator relative to said internally threaded articles.

9. The apparatus for applying patches of resin to internally threaded articles as defined in claim 1 including means to rotate the internally threaded article during said application of said stream of resin particles.

10. In an apparatus for applying patches of resilient heat softenable resin to internally circumferentially threaded articles having threaded portion and openings at both ends comprising:
    a support for conveying at a uniform continuous speed for treatment a uniform succession of said threaded articles, the openings at the ends of said articles being substantially uncovered;

means for heating said threaded portions of said articles to a temperature above the softening point of said resin;

means for providing a stream of fine particles of said resin entrained in a gaseous jet; and vacuum exhaust means adjacent the opening at the other end of said article on said support in operative relation to draw air through said threaded portions thereby reducing deposition of resin particles in undesired areas of said articles and drawing off resin particles which have passed through said threaded portions, the improvement which comprises:

a spray guide applicator associated with said stream adapted to direct said stream of entrained resin particles through one of the openings of one of said articles against an area of the threaded portion of said one article during movement in said path to cause said resin particles to be softened by heat from said threaded portion and to adhere to said area to create a locking deposit on said threaded portion, said applicator including an elongated conduit portion and a nozzle portion, said conduit portion having a cylindrical passageway therein, said nozzle portion having a generally cylindrical configuration and having top, bottom and side walls, said bottom wall having an opening communicating with said cylindrical passageway; and a slot opening disposed in said wall in a plane forming substantially a right angle to said cylindrical passageway, said top wall forming a deflector surface for said stream of resin particles whereby said stream of resin particles is directed in a line of discharge against said threaded portion of said aritcle being in a plane substantially at a right angle to the plane of said threaded portion of said article, said slot opening having a circumferential length of between about 100 degrees to about 310 degrees to provide a controlled and defined stream of resin particles.

11. A spray guide applicator for atomizing and directing a stream of fine particles of resin against a portion of the circumferential threads of an internally threaded article above ambient temperature to form a locking patch deposit of said resin, said applicator comprising an elongated conduit portion and a nozzle portion, said conduit portion having a central passageway therein, said nozzle portion having top, bottom and side walls, side bottom wall having an opening communicating with said central passageway, at least said nozzle portion being formed from material which readily dissipates heat;

a slot opening being horizontally disposed in said side wall in a plane forming substantially a right angle to said central passageway; and said top wall forming a deflector surface for directing substantially all of said stream of atomized resin particles in a line of discharge against said threaded portion of said article in a plane substantiallly at a right angle to the axis of said threade portion of said article to provide a controlled stream of resin particles.

12. The spray guide applicator as defined in claim 11 wherein the central passageway is cylindrical in shape.

13. The spray guide applicator as defined in claim 11 wherein the circumferential length of said slot opening is between about 100 degrees to about 310 degrees.

14. The spray guide applicator as defined in claim 11 wherein the circumferential length of said slot opening is between about 180 degrees to about 300 degress.

15. The spray guide applicator as defined in claim 11, wherein the diameter of said cylindrical nozzle portion is between about 60 percent to about 80 percent of the inner diameter of said internally threaded article.

16. The spray guide applicator as defined in claim 11 wherein the diameter of said cylindrical nozzle portion is between about 65 percent to about 75 percent of the inner diameter of said internally threaded article.

17. The spray guide applicator as defined in claim 11 wherein said applicator is formed of a metal which readily dissipates heat.

18. The spray guide applicator as defined in claim 17 wherein said metal is selected from the group consisting of aluminum and aluminum alloys.

19. A process of applying patches of resin to internally threaded articles having openings at both ends comprising the steps of:

supporting said threaded articles for treatment with the axis of threir threaded portion in an up and down position;

heating said articles to a temperature above ambient temperature;

inserting a nozzle having an arcuate slot therein for substantially horizontal discharge of said resin particles entrained in a gaseous jet through one of the upper and lower openings of one of said articles adjacent the area of the threaded portion of said articles to receive the patch deposit of said resin;

supplying a stream of resin particles entrained in a gaseous jet to said nozzle and directed through said arcuate slot against a portion of the threads of said one article to deposit resin particles on said area in a controlled manner;

retracting said nozzle from its position within said article whereby said resin particles are deposited on and softened by heat from said threaded area to cause said particles to adhere to said threaded area and create a locking patch deposit.

20. The process of applying patches of resin according to claim 19 wherein the nozzle occupies an area of between about 60 percent to about 80 percent of the inner diameter of the article.

21. The process of applying patches of resin according to claim 19 wherein the particles are discharged through an arcuate slot opening in said nozzle having a circumferential length from between about 100 degrees to about 310 degrees.

22. The process of applying patches of resin according to claim 21 wherein the circumferential length of said arcuate slot is between abut 180 degrees to about 300 degrees.

23. A process of applying locking patches of resilient heat softenable resin to internally threaded articles having openings at both ends comprising the steps of:

conveying a succession of said threaded articles at uniform speed in a path for treatment with the axes of the threaded portions of said articles in an up and down position and with the openings at the upper and lower ends of the threaded portions substantially uncovered;

heating said threaded portions of said articles to a temperature above the softening point of the resin to be applied;

inserting a nozzle having an arcuate slot for a substantially horizontal discharge of heat fusible resin particles entrained in a gaseous jet through the opening of said lower end of one of said articles adjacent the area of the threaded portion of said articles to receive the deposit of said locking resin;

supplying a stream of heat fusible resin particles entrained in a gaseous jet to said nozzle and directed through said arcuate slot against an area of the threaded portion of said one article to deposit resin particles on said area in a controlled manner; and softening said resin particles deposited on said area by heat from said threaded area to cause them to adhere to the area and create a locking patch deposit;

coalescing and fusing the deposited resin particles onto said threads;

interrupting said stream of heat fusible resin particles; and retracing said nozzle from its position within the lower end of said article.

24. The process of applying locking patches according to claim 23 further including the step of applying suction adjacent the opening at the upper end of said one article in operative relation for drawing air through said lower end opening to reduce deposition of resin particles on undesired areas of said articles thereby drawing off resin particles which have passes through said threaded portions.

25. The process of applying locking patches acording to claim 23 further including the step of cooling said resin from the fused state to a solid resilient condition providing locking action.

26. The process of applying locking patches according to claim 23 wherein the the nozzle occupies between about 60 percent to about 80 percent of the inner diameter of the fastener.

27. The process of applying patches according to claim 23 wherein the particles are discharged from said slot opening in said nozzle having a circumferential length between about 100 degrees to about 310 degrees.

28. The process of applying patches according to claim 27 wherein the circumferential length is between about 180 degrees to about 300 degrees.

29. The process according to claim 23 including the step of axially rotating the nozzle relative to the article.

30. The process according to claim 23 including axially rotating the threaded article relative to the nozzle.

* * * * *